United States Patent [19]
Yamamoto

[11] Patent Number: 5,481,173
[45] Date of Patent: Jan. 2, 1996

[54] VECTOR CONTROL SYSTEM FOR INDUCTION MOTOR

[75] Inventor: Yasuhiro Yamamoto, Tokyo, Japan

[73] Assignee: Kabushiki Kaisha Meidensha, Tokyo, Japan

[21] Appl. No.: 177,396

[22] Filed: Jan. 5, 1994

[30] Foreign Application Priority Data

Jan. 11, 1993 [JP] Japan .................................. 5-002228
Mar. 18, 1993 [JP] Japan .................................. 5-058750

[51] Int. Cl.⁶ .................................................. H02P 7/00
[52] U.S. Cl. .......................... 318/801; 318/807; 318/811
[58] Field of Search ................................. 318/798–815, 318/772

[56] References Cited

U.S. PATENT DOCUMENTS

| | | | |
|---|---|---|---|
| 4,509,003 | 4/1985 | Ohnishi et al. | 318/800 |
| 4,617,675 | 10/1986 | Ashikaga et al. | 318/801 |
| 4,680,526 | 7/1987 | Okuyama et al. | 318/802 |
| 4,751,447 | 6/1988 | Okachi | 318/800 X |
| 4,792,742 | 12/1988 | Fujimoto et al. | 318/805 |
| 4,808,903 | 2/1989 | Matsui et al. | 318/800 |
| 4,823,066 | 4/1989 | Yoshiki et al. | 318/798 |
| 4,862,343 | 8/1989 | Nomura et al. | |
| 4,967,135 | 10/1990 | Ashikaga et al. | |
| 5,136,228 | 8/1992 | Yamada et al. | 318/808 |
| 5,155,797 | 10/1992 | Nomura et al. | |
| 5,278,486 | 1/1994 | Kim | 318/811 |
| 5,298,847 | 3/1994 | Kerkman et al. | 318/800 |
| 5,365,158 | 11/1994 | Tanaka et al. | 318/806 |

FOREIGN PATENT DOCUMENTS 0333054 9/1989 European Pat. Off. .
3-253288 12/1991 Japan .

OTHER PUBLICATIONS

Patent Abstracts of Japan, vol. 016, No. 550, Nov. 1992.
Patent Abstracts of Japan, vol. 015, No. 494, Dec. 1991.
Patent Abstracts of Japan, vol. 015, No. 223, Jun. 1991.
Compensation of Parameters Variation of Induction Motor Improved Torque Control Characteristics at Low and High Speed Region, Yamada et al., vol. 112, No. 2, pp. 107–116.

Primary Examiner—Jonathan Wysocki
Attorney, Agent, or Firm—Foley & Lardner

[57] ABSTRACT

A vector control system of an induction motor using the slip frequency control method comprises means for minimizing an error with regard to compensation for variation of a secondary resistance.

5 Claims, 9 Drawing Sheets

DURING POWER RUNNING

DURING REGENERATION

DURING POWER RUNNING

DURING REGENERATION 5,481,173

VECTOR CONTROL SYSTEM FOR INDUCTION MOTOR

BACKGROUND OF THE INVENTION

The present invention relates generally to an adjustable speed drive system for an induction motor and more particularly, to a vector control system having compensation for a secondary resistance variation.

In the vector control system using the slip frequency control method, a secondary resistance of the induction motor is used for calculating a slip frequency, so that a variation in temperature of the secondary resistance causes a deterioration of torque control characteristic.

Some compensation methods of a variation of the secondary resistance are proposed. One is such that compensation for a secondary resistance variation is carried out by determining constants of the induction motor, and considering a difference between an output voltage of a model of the induction motor using these constants and an actual output voltage to be a variation due to a variation in temperature of the secondary constants.

With this method, however, in connection with a primary voltage, a command value due to a dead time of an inverter or a voltage drop of main circuit elements is sometimes different from an actual value, so that there is a limit with respect to achievement of high torque control accuracy. Moreover, this method cannot correspond to a change in temperature of a primary resistance.

Another method is such that compensation for a secondary resistance variation is carried out based on the fact that on the $\gamma$-$\delta$ axes having a primary current set as a reference axis, a voltage component of the $\delta$ axis which is normal to the primary current is not influenced by the primary resistance.

This method enables compensation for a secondary resistance variation which is robust to a change of the primary resistance, since a current control system is constructed on the d-q axes having a secondary magnetic flux set as a reference axis, and a component of a primary voltage variation on the $\delta$ axis is detected by a pulse width modulation (PWM) signal. For further information, see, for example, Paper D, vol. 112, No. 2, pp. 107–116, published in 1993 by Electric Society, or JP-A 3-253288.

With the latter method, however, due to a power source voltage, etc., the adjustable speed drive system has an upper limit of a possible output voltage, so that when a current control amplifier (refer hereinafter to as ACR amplifier) outputs a voltage command above the upper limit (which is generally called voltage saturation), an error is produced between a current command and a current passing through the induction motor. In view of this error, the latter method is available only in an area without voltage saturation. Further, when a voltage type PWM inverter is used in a voltage control part, a pulse lack is produced when the PWM pulse width becomes smaller than the dead time, resulting in a deterioration of current accuracy in the amplitude and phase. In this case, compensation for a secondary resistance variation has an error.

Moreover, although the latter method enables compensation for a secondary resistance variation which is robust to a change of the primary resistance, if set values of an exciting inductance M' (= $M^2/L_2$ wherein $L_2$ is a secondary inductance) and an equivalent leakage inductance $L\sigma$ have an error, this method suffers an influence of a voltage error.

It is, therefore, an object of the present invention to provide a vector control system for an induction motor which enables more accurate compensation for a secondary resistance variation.

SUMMARY OF THE INVENTION

There is provided, according to the present invention, a vector control system for an induction motor which is driven by an inverter controlled by a pulse width modulation circuit, the system carrying out compensation for variation of a secondary resistance, comprising:

a first means for calculating target values $I_1d^*$ and $I_1q^*$ of d- and q-axis components of a primary current of the induction motor on d-q coordinates having a secondary magnetic flux set as a reference axis, said d-q coordinates being rotational coordinates which rotate in synchronism with a power source angular frequency of the induction motor;

a first coordinate transformation part arranged to calculate in accordance with said target values $I_1d^*$ and $I_1q^*$ of said d- and q-axis components a target value $I_1\gamma^*$ (=$I_1$) of a $\gamma$-axis component of the primary current and a phase difference $\psi$ on $\gamma$-$\delta$ coordinates having said phase difference $\psi$ with respect to d-q axes and having said primary current $I_1$ set as a reference axis;

a slip angular frequency operation part arranged to input and calculate said ratio $\lambda_{2d}^*/M^*$ and said target value $I_1q^*$ of said q-axis component so as to output a target value $\omega_s^*$ of a slip angular frequency;

a second means for calculating target values $V_1\gamma^*$ and $V_1\delta^*$ of $\gamma$- and $\delta$-axis components of a primary voltage in accordance with a ratio $\lambda_{2d}^*/M^*$ of a target value $\lambda_{2d}^*$ of said secondary magnetic flux to a target value $M^*$ of an exciting inductance, calculation results of said first coordinate transformation part and a command value $\omega_0$ of said power source angular frequency;

a second coordinate transformation part arranged to transform a detection value of said primary current into actual $\gamma$- and $\delta$-axis components $I_1\gamma$ and $I_1\delta$ on said $\gamma$-$\delta$ coordinates;

a third means for calculating a variation $\Delta V_1\delta$ with respect to said $V_1\delta^*$ of said $\delta$-axis component of said primary voltage in accordance with said target values $I_1\delta^*$ and $I_1\delta^*$ of said $\delta$- and $\delta$-axis components of said primary current and said actual $\gamma$- and $\delta$-axis components $I_1\gamma$ and $I_1\delta$ derived from said second coordinate transformation part;

a polar coordinate transformation part arranged to add said target values $V_1\gamma^*$ and $V_1\delta^*$ derived from said second means to said variation $\Delta V_1\delta$ derived from said third means so as to output a magnitude $|V_1|$ of a vector of said primary voltage and a phase angle $\phi$ thereof with respect to a $\gamma$ axis; and a fourth means for minimizing an error with regard to compensation for variation of the secondary resistance.

DETAILED DESCRIPTION OF THE INVENTION

Figure 1:
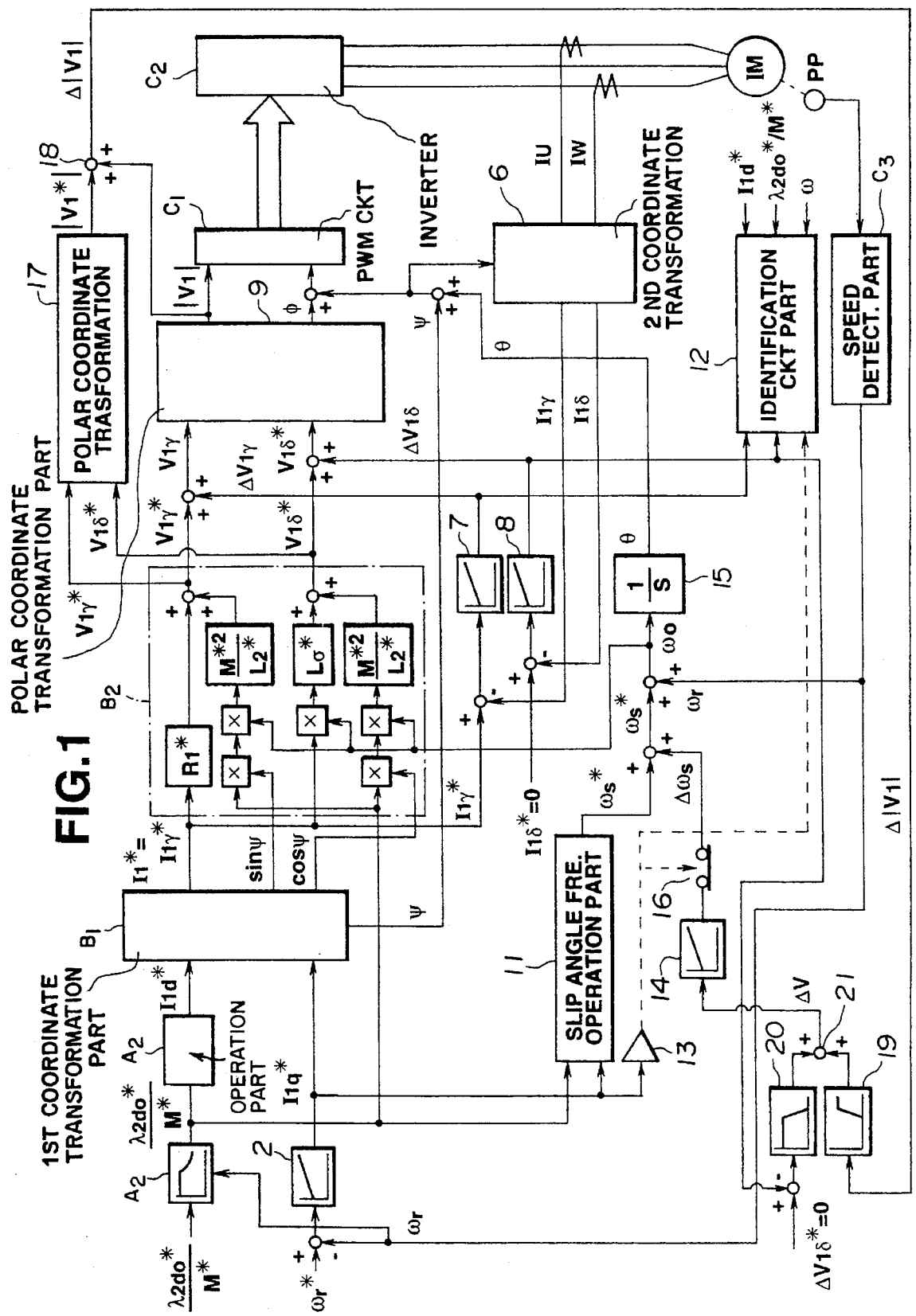
FIG. 1 is a block diagram showing a first preferred embodiment of a vector control system for an induction motor according to the present invention.

Referring to the drawings, preferred embodiments of a vector control system for an induction motor will be described.

Before entering the first embodiment, a detailed description will be made with regard to inconvenience encountered in JP-A 3-253288.

When using a T-I type equivalent circuit (for reference, see FIG. 13), and shown in the form of a vector space, a voltage-current equation of the induction motor is generally given by a formula (1):

$$\begin{bmatrix} v_1 \\ 0 \end{bmatrix} = \begin{bmatrix} R_1 + PL\sigma + \omega L\sigma \times & \omega M' \times \\ -R_2' & R_2' + PL\sigma + \omega_s M' \times \end{bmatrix} \begin{bmatrix} i_1 \\ \dfrac{\lambda_2}{M} \end{bmatrix} \quad (1)$$

wherein $V_1$: primary voltage, $i_1$: primary current, $R_1, R_2'$: primary and secondary resistances, $\lambda_2$: secondary magnetic flux, M: exciting inductance, ω: primary power source angular frequency, $\omega_S$: slip angular frequency, Lσ: leakage inductance,

M': $=M^2/L_2$,

P: =d/dt: differential operator.

Assuming that only steady terms are available in the formula (1), the formula (1) can be rewritten as a formula (2):

$$\begin{bmatrix} v_1 \\ 0 \end{bmatrix} = \begin{bmatrix} R_1 + \omega L\sigma \times & \omega M' \times \\ -R_2' & R_2' + \omega_s M' \times \end{bmatrix} \begin{bmatrix} i_1 \\ \dfrac{\lambda_2}{M} \end{bmatrix} \quad (2)$$

In view of a steady state, when shown in a Feather vector, the formula (2) is replaced by a formula (3):

$$\begin{bmatrix} \dot{v}_1 \\ 0 \end{bmatrix} = \begin{bmatrix} R_1 + j\omega L\sigma & j\omega M' \\ -R_2' & R_2' + j\omega_s M' \end{bmatrix} \begin{bmatrix} \dot{i}_1 \\ \dfrac{\lambda_2}{M} \end{bmatrix} \quad (3)$$

When a current control is carried out, and thus a vector $I_1$ is constant, a vector $\lambda_2/M$ and a vector $V_1$ are obtained.

From the formula (3), second line, a formula (4) is obtained:

$$\dot{i}_1 \times R_2' = (R_2' + j\omega_s M') \times \left(\dfrac{\lambda_2}{M}\right) \quad (4)$$

$$\left(\dfrac{\lambda_2}{M}\right) = \dfrac{\dot{i}_1}{1 + j\omega_s \left(\dfrac{M'}{R_2'}\right)}$$

$$= \dfrac{\dot{i}_1}{1 + j\alpha} = \dfrac{1 - j\alpha}{1 + \alpha^2} \dot{i}_1$$

wherein $\alpha = \omega_S (M'/R_2')$.

Additionally, from the formula (3), first line, and the formula (4), a formula (5) is obtained:

$$\dot{v}_1 = \left(R_1 + j\omega L\sigma + j\omega M' \dfrac{1 - j\alpha}{1 + \alpha^2}\right) \dot{i}_1 = \quad (5)$$

$$\left[R_1 + j\omega L\sigma + \omega M' \left(\dfrac{\alpha}{1 + \alpha^2} + j\dfrac{1}{1 + \alpha^2}\right)\right] \dot{i}_1$$

Figure 3:
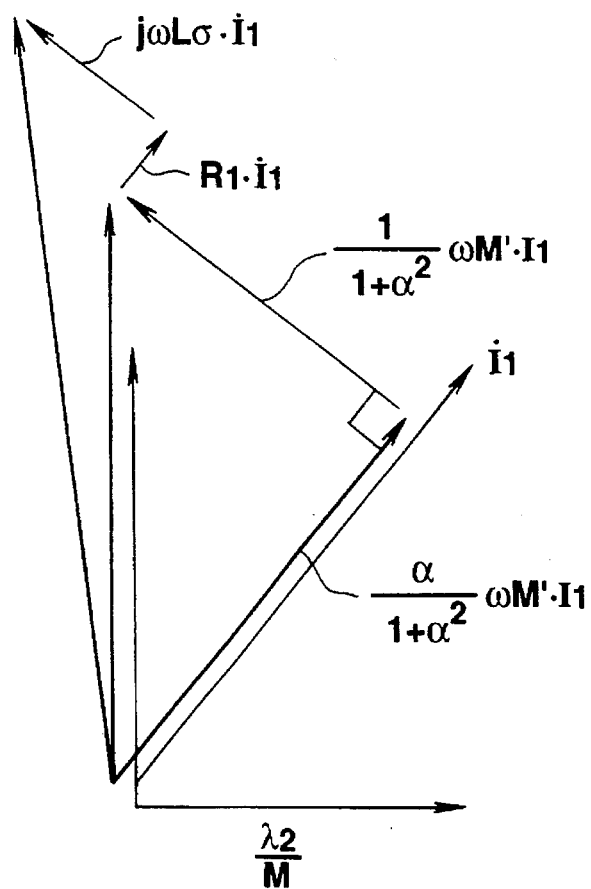
FIG. 3 is a vector diagram showing a formula (5)

FIG. 3 shows a vector diagram of the formula (5).

In JP-A 3-253288, conditions of compensation for a secondary resistance variation (refer hereinafter to as $R_2$ compensation) are as follows:

$$\begin{aligned} I_1^* &= I_1 \\ R_1^* &= R_1 \\ R_2'^* &\neq R_2' \\ M'^* &= M' \\ L_\sigma^* &= L_\sigma \end{aligned} \quad (6)$$

wherein a reference with asterisk designates a data or target value of the induction motor stored in a control system, whereas a reference without asterisk designates a constant or value of the actual induction motor. Here, an inconsistency is found only in the third condition ($R_2'^* \neq R_2'$). From the above conditions and since vector $I1^* = I_1 d^* + jI_1 q^*$ (wherein $I_1 d^*$ and $I_1 q^*$ are target values of d-axis and q-axis components of I1), the slip angular frequency $\omega_S$ is expressed by a formula (7):

$$\omega_s^* = \omega_s = \dfrac{R_2'^*}{M'^*} \times \dfrac{I_{1q}^*}{I_{1d}^*} \quad (7)$$

When applying $\alpha = \omega_S (M'/R_2')$ to the formula (7), a formula (8) is obtained:

$$\alpha = \frac{R_2'^*}{M'^*} \times \frac{M'}{R_2'} \times \frac{I_{1q}^*}{I_{1d}^*} = \frac{R_2'^*}{R_2'} \times \frac{I_{1q}^*}{I_{1d}^*} \quad (8)$$

Here, $\alpha$ is varied with a ratio of $R_2'^*/R_2'$, however, the term of $\alpha$ in the formula (5) is given by a formula (9):

$$\left( \frac{\alpha}{1+\alpha^2} + j \frac{1}{1+\alpha_2} \right) = 1 < \tan^{-1}\left( \frac{1}{\alpha} \right) \quad (9)$$

Figure 4:
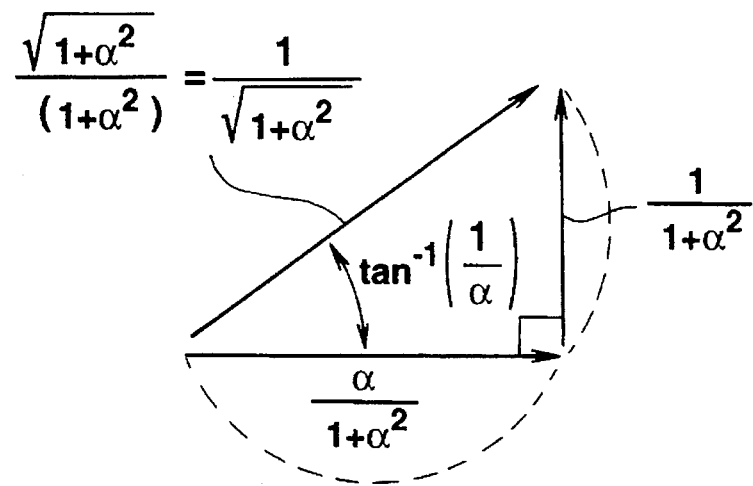
FIG. 4 is a view similar to FIG. 3, showing a formula (9)

From the formula (9), it is understood that regardless of $\alpha$, the amplitude is 1, and only the orthogonal ratio is changed. The formula (9) is diagrammatically shown by FIG. 4. Thus, in connection with a variation of the vector $V_1$, when $\alpha$ is varied by $R_2'$, only a third term in the formula (5) is changed. This third term is given by a formula (10):

$$E_2 = \omega M' \times I_1 \times \left( \frac{\alpha}{1+\alpha^2} + j \frac{1}{1+\alpha^2} \right) \quad (10)$$

Figure 5:
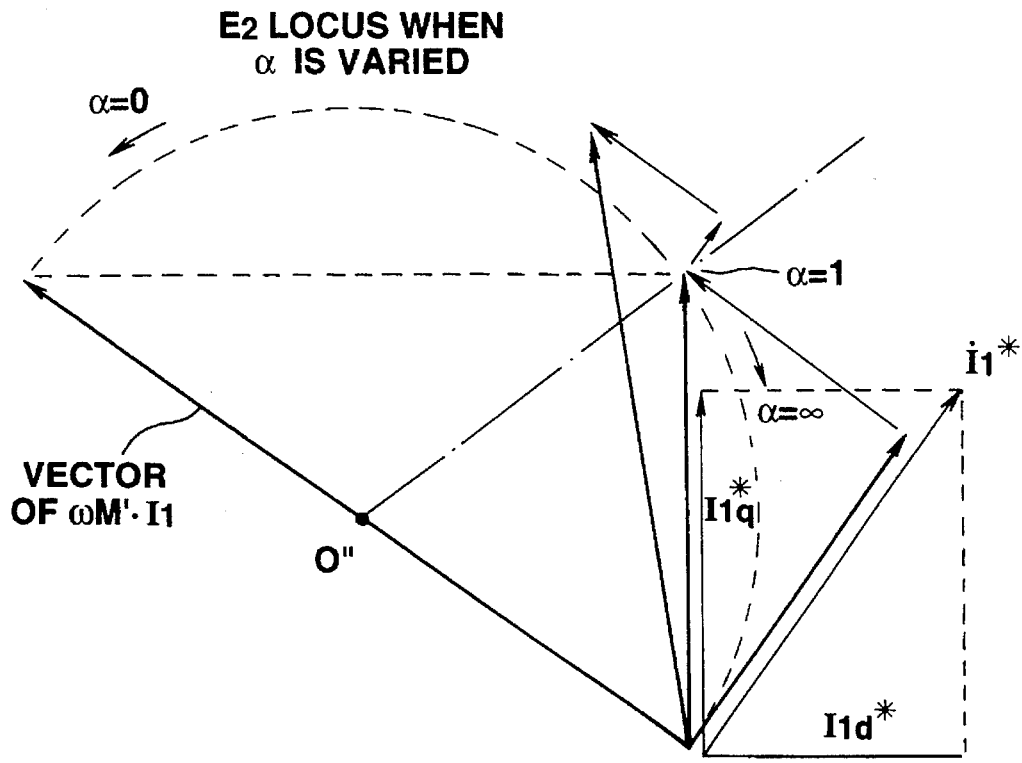
FIG. 5 is a view similar to FIG. 4, upon load power running.
Figure 6:
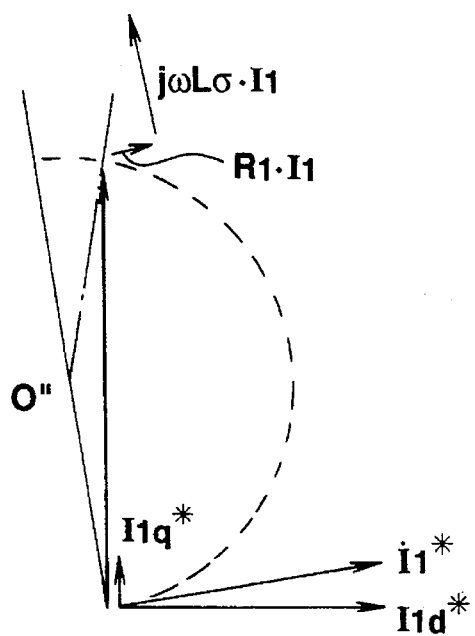
FIG. 6 is a view similar to FIG. 5, upon light-load power running.
Figure 7:
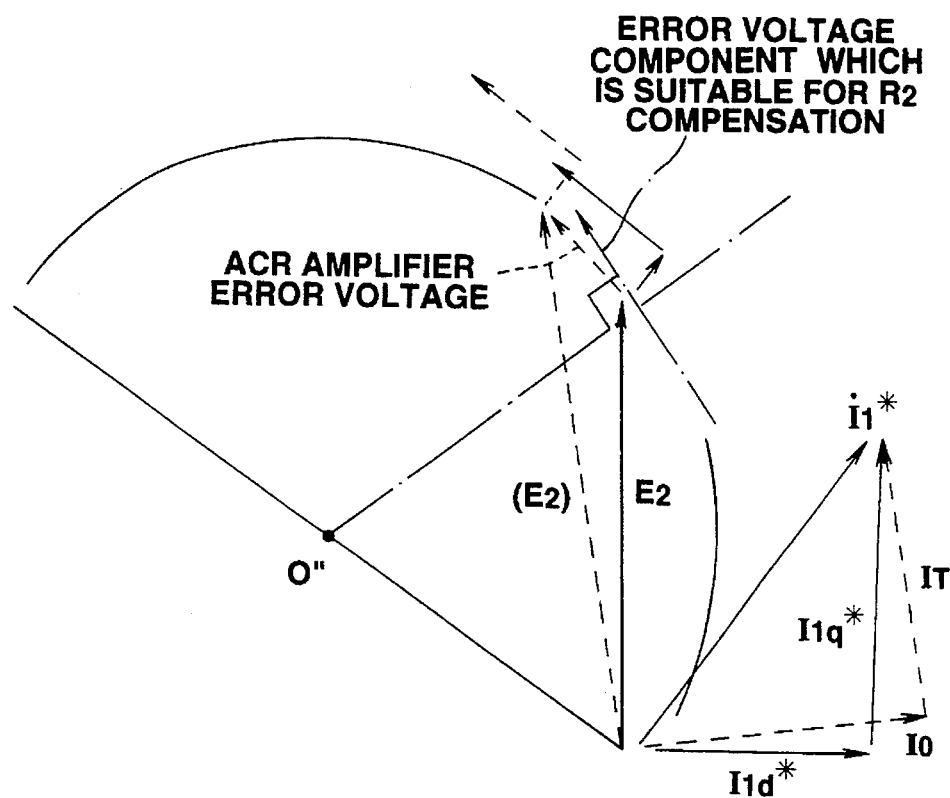
FIG. 7 is a view similar to FIG. 6, showing E2 vector movement.
Figure 8:
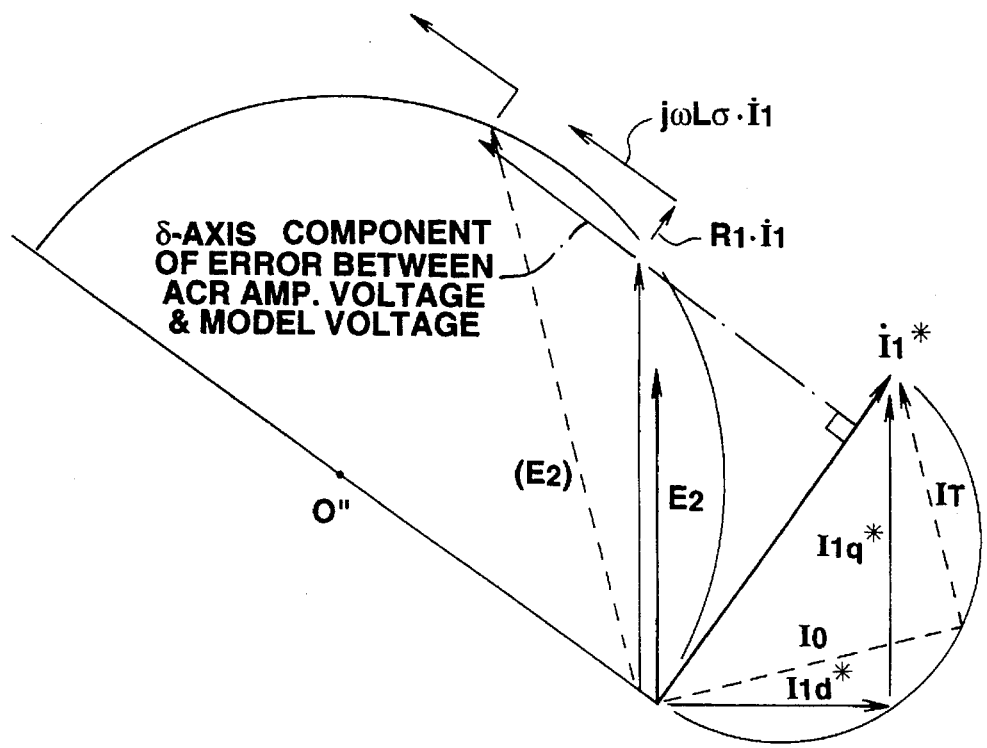
FIG. 8 is a view similar to FIG. 7, showing a δ-axis component of a voltage error.

Therefore, the locus of a secondary voltage $E_2$ is as shown in FIG. 5 upon load power running, and as shown in FIG. 6 upon light-load power running. In case that $R_2$ compensation is carried out based on a voltage error, when extracting the voltage error in the direction of a tangent line of the semicircular $E_2$ locus which varies ideally from $\alpha = 0$ to $\alpha = \infty$ in FIGS. 5 and 6, components of the voltage error are symmetrical whether $R_2'$ deviates to the positive or the negative. However, in reality, the resistance $R_1$ is also varied with the temperature. Thus, in connection with the voltage error components, it is preferable to use a δ-axis component which is normal to a component of $(R_1 \cdot I_1)$ to extract an angular component which contacts the $E_2$ locus as shown in FIG. 7. This will easily be understood in FIG. 8. The above uses a component which is normal to a term of $R_1$ in the formula (5). This component is given by the formula (11):

$$\omega M' \times I_1 \times j \frac{1}{1+\alpha^2} \quad (11)$$

The above method is a fundamental principle for $R_2$ compensation shown in JP-A 3-253288. In this method, since the width of the PWM pulse is reduced as voltage approaches a saturation, a pulse lack is produced due to a switching lag and dead time of an inverter, and an operation of dead time compensation. As a result, a current detection error causes an error in the current control accuracy. Further, in the above method, a current control should be carried out normally so that a current command corresponds to an actual current. Thus, a current error causes a malfunction of $R_2$ compensation.

Next, a consideration will be made with regard to an influence of the current error on $R_2$ compensation. When expressing the current error by an amplitude component and a phase component, a formula (12) is obtained:

$$(I_1 - I_1^*) = (\Delta I_1)\gamma + j(\Delta I_1)\delta \quad (12)$$

$$\Delta \theta \approx \frac{\Delta I_1 \delta}{I_1^* + (\Delta I_1)\gamma}$$

$$|I_1| = \sqrt{(I_1^* + (\Delta I_1)\gamma)^2 + (\Delta I_1 \delta)^2}$$

When applying the formula (12) to the formula (5), the voltage error component due to the current error is expressed by a formula (13):

$$\dot{V}_1 = \left[ R_1 + j\omega L \delta + \omega M' \left( \frac{\alpha}{1+\alpha^2} + j\frac{1}{1+\alpha^2} \right) \right] \times \quad (13)$$

$$\{I_1^* + (\Delta I_1)\gamma + j(\Delta I_1)\delta\}$$

If only a j component is extracted in the formula (13), a voltage error component on the δ axis due to the current error is expressed by a formula (14):

$$j\Delta \dot{V}_1 = j\left[ \omega L \delta + \omega M' \left( \frac{1}{1+\alpha^2} \right) \right] + (\Delta I_1)\gamma + \quad (14)$$

$$j\left[ R_1 + \omega M' \left( \frac{\alpha}{1+\alpha^2} \right) \right] \times (\Delta I_1)\delta$$

Here, at no load ($\alpha = 0$), an influence of $\Delta I_1 \gamma$ is only a factor of malfunction of $R_2$ compensation, whereas at load ($\alpha = 0$ to 5), an influence of $\Delta I_1 \delta$ is increased. Measurement of the current error upon real occurrence of a pulse lack reveals that the error of $\Delta I_1 \delta$ is greater than that of $\Delta I_1 \gamma$ due to a pulse lack, and an amount thereof is substantially constant regardless of a current load, and presence of a pulse lack determines whether the current error is produced or not. Thus, when using the voltage error on the δ axis, no error is produced at no load, whereas a greater error is produced at load.

If the secondary resistance is incorrectly modified by the above error component, $\omega_S$ in $\alpha = \omega_S (M'/R_2')$ is different from the vector control condition, so that a value of $\alpha$ has an error, and semicircular $E_2$ vector movement is produced as shown in FIG. 7. Referring to FIG. 7, if $\alpha$ is modified to a small value, a radius of $E_2$ becomes greater, and a voltage saturation is advanced further, resulting in a further lowering of $\alpha$. As a result, if the current error is produced due to a pulse lack, and once $\alpha$ is modified in the lowered direction, a voltage is increased up to a limit of saturation by a positive feedback operation, a value of $\alpha$ becomes smaller, and cannot return from that state. Thus, $R_2$ compensation using the δ axis is not available in a pulse lacked area wherein the current and voltage accuracy is deteriorated.

In the vicinity of a voltage saturation, it is reasonable to use a voltage component other than the voltage error on the δ axis. In case of the current control system having a greater phase error of the current accuracy, only the amplitude of the vector is used in view of a large error of a phase component. Moreover, referring to FIG. 7, it is understood that if $\alpha$ is changed by a variation of $R_2$, the voltage amplitude is also changed at load, so that $R_2$ compensation is possible based on an error component of the voltage amplitude. However, at no load, the voltage amplitude error is not influenced by an $R_2$ variation in the same manner as the voltage error on the δ axis, so that an interruption of $R_2$ compensation is needed.

Referring to FIGS. 1 and 3–11, there is shown a first preferred embodiment of the present invention.

Referring to FIG. 1, $A_1$ designates a secondary magnetic flux command amplifier which outputs $\lambda_2^*/M^*$ in response to a rotor angular frequency $\omega_r$ out of a speed detection part $C_3$. It is to be noted that a reference with asterisk designates a target value. The command amplifier 11 outputs $\lambda_{2do}^*/M$ until $\omega_r$ exceeds a predetermined value. When $\omega_4$ exceeds the predetermined value, and enters a field control area, $\lambda_{2d}^*/M$, becomes smaller in accordance with $\omega_4$.

$A_2$ designates an operation part which carries out an operation of $\lambda_2^*/M^* \{1+ (L_2^*/R_2'^*) P\}$.

$B_1$ designates a first coordinate transformation part which serves to operate, in accordance with target values $I_1d^*$, $I_1q$, of d- and q-axis components of the primary current $I_1$ of the induction motor IM, a phase difference $\psi$ between a target value $I_1\gamma$, and the d and $\gamma$ axes in the $\gamma$-$\delta$ coordinates having a primary current $I_1$ set as a reference axis.

$B_2$ designates an ideal voltage operation part which operates a target value of the primary voltage $V_1$. The operation part $B_2$ inputs sin $\psi$, $I_1$, cos $\psi$ derived from the first coordinate transformation part $B_1$, and $\lambda_2^*/M^*$ derived from the secondary magnetic flux command amplifier 11, and the power source angular frequency, and operates these so as to obtain target values $V_1\gamma^*$, $V_1\delta^*$.

6 designates a second coordinate transformation part which detects the primary current $I_1$ of the induction motor IM, and transforms detection values $I_U$, $I_W$ into $\gamma$- and $\delta$-axis components $I_1\gamma$, $I_1\delta$ in the $\gamma$-$\delta$ coordinates. The components $I_1\gamma$, $I_1\delta$ are compared with target values $I_1\gamma^*$, $I_1\delta^*$ (=0), respectively, and deviations thereof are input to proportional-integral (PI) amplifiers 7, 8 which serve as an ACR amplifier.

The PI amplifiers 7, 8 output error variations $\Delta V_1\gamma$, $\Delta V_1\delta$, respectively, which are added to target values $\Delta V_1\gamma^*$, $\Delta V_1\delta^*$ derived from the ideal voltage operation part $B_2$, and input to a polar coordinate transformation part 9. In accordance with input values, the polar coordinate transformation part 9 outputs a magnitude $|V_1|$ of the vector $V_1$ of the primary voltage, and a phase angle $\phi$ thereof with the $\gamma$ axis. The phase angle $\phi$ is added to the phase difference $\psi$ and $\theta$ ($\omega_0 t$) as will be described later, which is input to a PWM circuit $C_1$ together with the magnitude $|V_1|$, and transformed into a primary voltage command value corresponding to the U, V, and W phase, thus controlling a voltage of an inverter $C_2$.

11 designates a slip angular frequency operation part which receives $\lambda_{2d}^*/M^*$ and $I_1q^*$ so as to obtain a slip angular frequency $\omega_S$ on the output side thereof.

12 designates an identification circuit part which serves at no load to input $\Delta V_1\gamma$ and $I_1d^*$ so as to calculate a variation of the primary resistance for identification of $R_1$, and also to receive $\Delta V_1 d$, $\omega$, and $\lambda_{2d}^*/M^*$ So as to calculate a variation of the exciting inductance M for identification of M' (=$M^2/L_2$).

Here, a determination whether a no-load running is effective or not and a drive timing of the identification circuit part 12 are carried by an output of a comparator 13. In case that a rated torque current is 100%, and a value of 5% thereof is a set value, for example, if a comparison reveals that the set value is smaller than $I_1q^*$, the comparator 13 determines that a no-load running is effective, and drives the identification circuit part 12.

14 designates a PI amplifier which serves as a voltage variation part control amplifier, and receives on the input side thereof an error voltage $\Delta V$ used for $R_2$ compensation as will be described later. On the output side of the PI amplifier 14, a first adder (no numeral) adds a variation $\Delta \omega_S$ of the slip angular frequency to the target value $\omega_S$ of the slip angular frequency through a switching part 16 so as to obtain a new target value $\omega_S^*$ thereof at the output side of the adder. In a second adder (no numeral), this new target value $\omega_S^*$ is added to the rotor angular frequency $\omega_r$ so as to obtain a primary angular frequency $\omega_0$ as an added output. The primary angular frequency $\omega_0$ is provided to the ideal voltage operation part $5_2$, and also to an integrator 15 so as to obtain $\theta$.

17 designates a first operation part which receives the outputs $V1\gamma^*$, $V_1\delta^*$ of the ideal voltage operation part $B_2$ for polar coordinate transformation. As an output of the first operation part 17, an amplitude component $|V_1^*|$ of the primary voltage is obtained. A second operation part 18 receives the amplitude component $|V_1^*|$ at the positive terminal thereof, and the output $|V_1|$ of the polar coordinate transformation part 9 at the negative terminal thereof. As an output of the second operation part 18, an error $\Delta|V_1|$ of the two (i.e., error component of the voltage amplitude) is obtained. This output $\Delta|V_1|$ is provided to a third operation part 19 having a weight function to a rotating speed.

20 designates a fourth operation part which having a weight function to a rotating speed. The fourth operation part 20 receives on the input side thereof a deviation with respect to the $\delta$-axis error components $\Delta V_1\delta$, $\Delta V_1\delta^*$ (=0) derived from the PI amplifier 8. Outputs of the third and fourth operation parts 19, 20 are added in an adder 21 which provides an added output $\Delta V$ (i.e., error voltage used for $R_2$ compensation) to be provided to the PI amplifier 14.

The reason of giving to the third and fourth operation parts 19, 20 the weight function to the rotational speed is as follows: Ordinarily, referring to FIGS. 9–11, when simply changed over by a switch, both output voltages (i.e., amplitude and $\delta$-axis components) of the third and fourth operation parts 19, 20 are changed discontinuously. Thus, for smooth switching, it is preferable to use the weight function K. When giving the weight function K to the third and fourth operation parts 19, 20, the error voltage $\Delta V$ used for $R_2$ compensation is given by a formula (15):

$$\Delta V = K_{V\delta} \times (\Delta V_1 \delta) + K_{V_{Rx}}(\Delta|V_1|) \tag{15}$$

Figure 9:
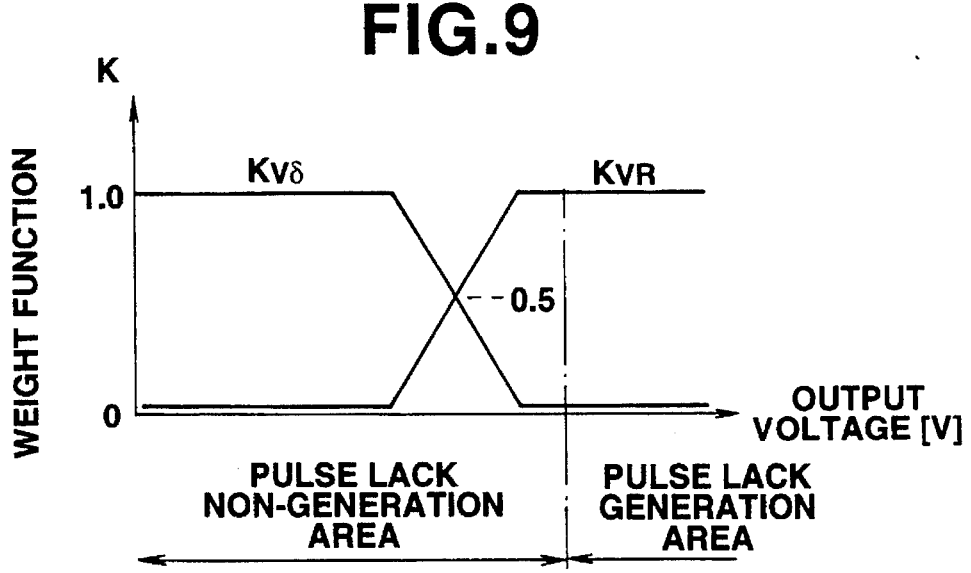
FIG. 9 is a characteristic diagram of output voltage vs. weight function.
Figure 10:
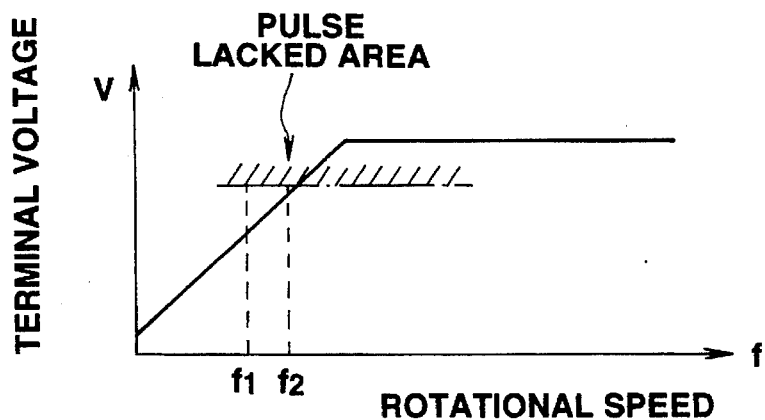
FIG. 10 is a view similar to FIG. 9, but of rotational speed of the induction motor vs. terminal voltage thereof.
Figure 11:
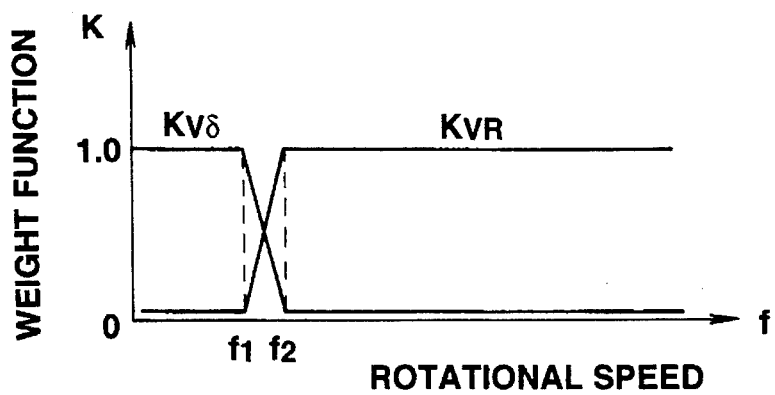
FIG. 11 is a view similar to FIG. 10, but of rotational speed vs. weight function.

FIG. 9 graphically shows the relationship given by the formula (15). In a characteristic diagram of the weight function K shown in FIG. 9, the output voltage V is taken on the x axis, which has a large change, however, since it also varies with the load. On the other hand, as seen in FIG. 10, the terminal voltage of the induction motor IM is increased substantially in proportion to the rotational speed thereof. By using this, the rotational speed can be taken on the x axis as shown in FIG. 11. In the first embodiment as shown in FIG. 1, the third and fourth operation parts 19, 20 have the weight function defined in such a manner, respectively.

Figure 2:
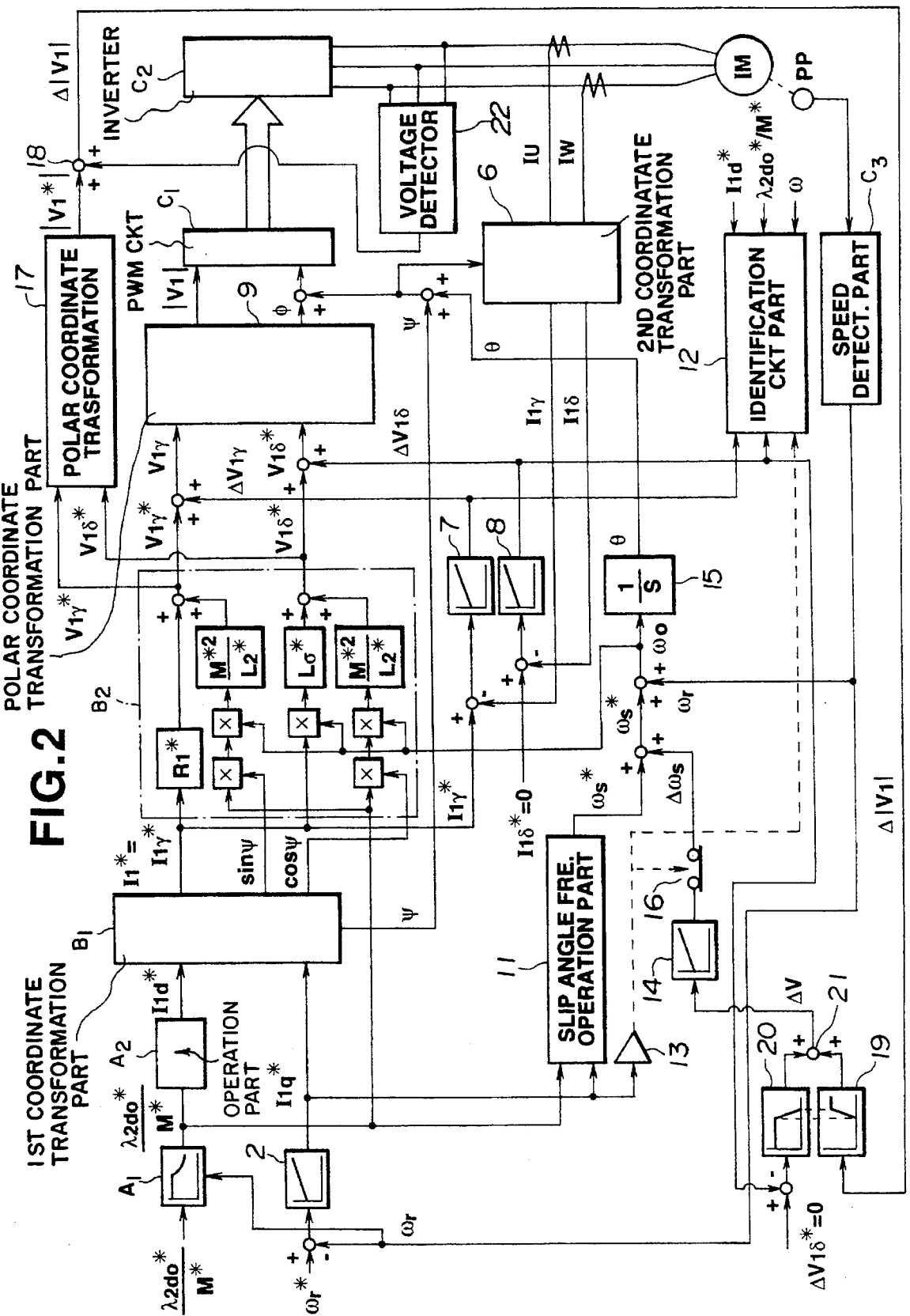
FIG. 2 is a view similar to FIG. 1, showing a second preferred embodiment of the present invention.

Referring to FIG. 2, there is sown a second preferred embodiment of the present invention. A voltage detector 22 is arranged for detecting an output voltage of the inverter $C_2$. A voltage detected by the detector 22 is provided to the negative terminal of the second operation part 18. According to this embodiment, voltage accuracy of the PWM circuit $C_1$ fails to be concerned in control accuracy, resulting in improvent thereof.

Referring to FIGS. 12–15B, there is shown a third preferred embodiment of the present invention.

Figure 13:
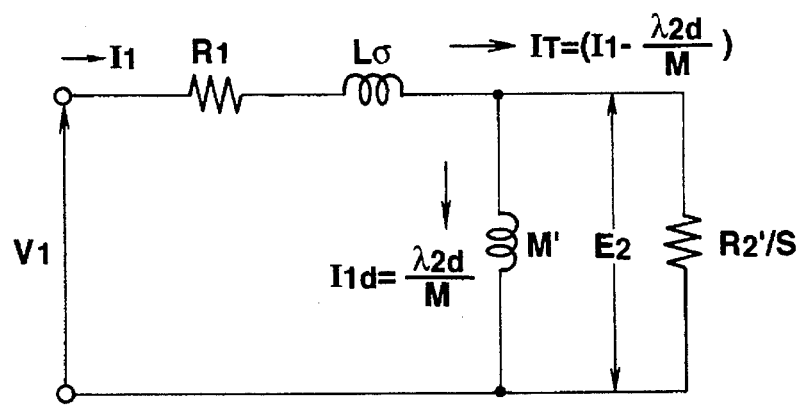
FIG. 13 is a T-I equivalent circuit of the induction motor.

When expressed by two-axes on the rotational coordinates, and using a T-I type equivalent circuit as shown in FIG. 13, an equation of the induction motor is generally given by a formula (1'):

$$\begin{bmatrix} V_1 d \\ V_1 q \\ 0 \\ 0 \end{bmatrix} = \begin{bmatrix} R_1 & -\omega_1 L\sigma & 0 & -\omega_1 M' \\ \omega_1 L\sigma & R_1 & \omega_1 M' & 0 \\ -R_2' & 0 & R_2' & -\omega_S M' \\ 0 & -R_2' & \omega_S M' & R_2' \end{bmatrix} \begin{bmatrix} I_1 d \\ I_1 q \\ \lambda_2 d/M \\ \lambda_2 q/M \end{bmatrix} \tag{1'}$$

wherein $V_1 d$, $V_1 q$: d- and q-axis components of a primary voltage, $I_1 d$, $I_1 q$: d- and q-axis components of a primary current, $R_1$, $R_2$: primary and secondary coil resistances, $L_1$, $L_2$: primary and secondary inductances, M: primary and secondary mutual inductances, $\omega_1$: primary angular frequency, $\omega_S$: slip angular frequency, Lσ: $L_1 - M^2/L_2$,
$R_2'$: $(M/L_2)^2 \cdot R_2$,
$\lambda_2 d/M$: $I_1 d + (L_2/M)I_2 d$,
$\lambda_2 q/M$: $I_1 q + (L_2/M)I_2 q$.

Here, a vector control condition is given by a formula (2'):

$$\omega_s = \frac{R_2'}{M'} \times \frac{I_1 q}{(\lambda_2 d/M)} \tag{2'}$$

$$T = \frac{POLE}{2} \times M' \times \frac{\lambda_2 d}{M} \times I_1 q$$

wherein T is a torque, and POLE is the number of poles of the induction motor.

By establishment of the formula (2'), a formula (3') is established, obtaining the torque current $I_1 q$ and torque T linearized.

$$\lambda_2 q/M = 0$$

$$I_1 d = \lambda_2 d/M \tag{3'}$$

Figure 14A:
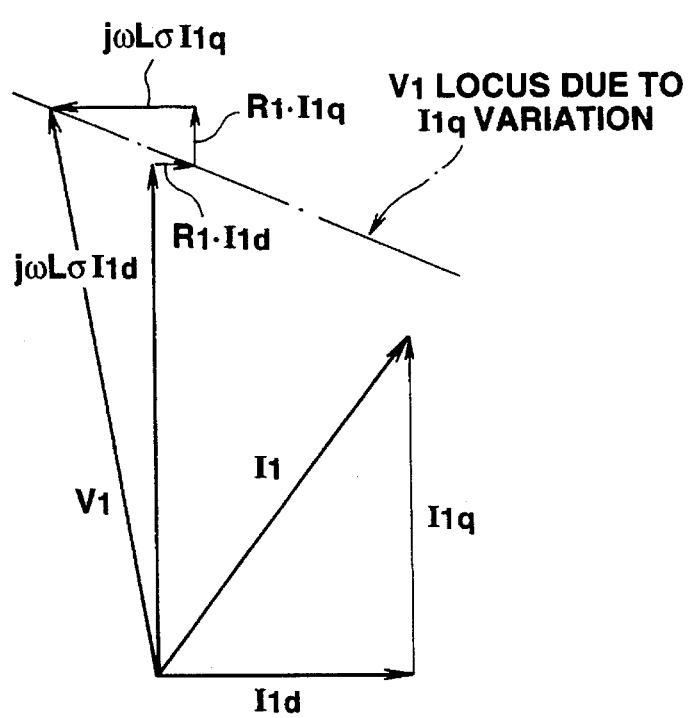
FIG. 14A is a view similar to FIG. 8, upon power running.
Figure 14B:
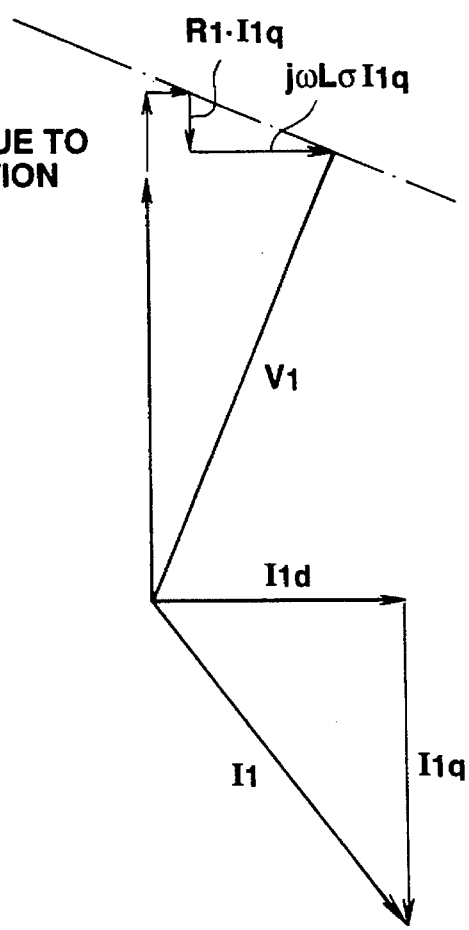
FIG. 14B is a view similar to FIG. 14A, upon regeneration.

At that moment, a voltage-current vector diagram is as shown in FIGS. 14A and 14B. FIG. 14A is a vector diagram upon power running, whereas FIG. 14B is a vector diagram upon regeneration.

In the formula (1'), a consideration will be made with regard to a case that due to occurrence of a variation of the secondary resistance, a value thereof $R_2'$ is changed to $R_2'x$. When carrying out the vector control on condition that the other constants $R_1$, Lσ, M' correspond to those of the model of the induction motor, and errors of the frequency, voltage and current are neglected, $I_1 d$, $I_1 q$ and $\omega_s$ are fixed if the ACR amplifier operates in response to a command value, whereas $\lambda_2 d/M$, $\lambda_2 q/M$, $V_1 d$, $V_1 q$ are varied due to a variation of the secondary resistance $R_2'$.

This variation appears in the formula (1'), lines 3 and 4, and is given by a formula (4'):

$$I_1 d = \frac{\lambda_2 d}{M} - \omega_s \times \frac{M'}{R_2'x} \times \frac{\lambda_2 q}{M} \tag{4'}$$

$$I_1 q = \frac{\lambda_2 q}{M} + \omega_s \frac{M'}{R_2'x} \times \frac{\lambda_2 d}{M}$$

When applying $\omega_S$ of the formula (2') to the formula (4'), and having a change of $\lambda_2 d$ and $\lambda_2 q$ to $\lambda_2 dx$ and $\lambda_{22} qx$, respectively, a solution of the simultaneous equations of the formula (4') is given by a formula (5'):

$$\left(\frac{\lambda_2 dx}{M} - I_1 q\right) \times \frac{\lambda_2 dx}{M} + \left(\frac{\lambda_2 qx}{M} - I_1 q\right) \frac{\lambda_2 qx}{M} = 0 \tag{5'}$$

From the relationship of $(x^2 - ax) = (x - a/2)^2 - (a/2)^2$, the formula (5') is developed to a formula (6'):

$$\left(\frac{\lambda_2 dx}{M} - \frac{I_1 d}{2}\right)^2 + \left(\frac{\lambda_2 qx}{M} - \frac{I_1 q}{2}\right)^2 = \left(\frac{I_1 d}{2}\right)^2 + \left(\frac{I_1 q}{2}\right)^2 \tag{6'}$$

The formula (6') is diagrammatically shown by a circle having a center of $(I_1 d/2, I_1 q/2)$, and a radius of $\{(I_1 d/2)^2 + (I_1 q/2)^2\}^{1/2}$.

Figure 15A:
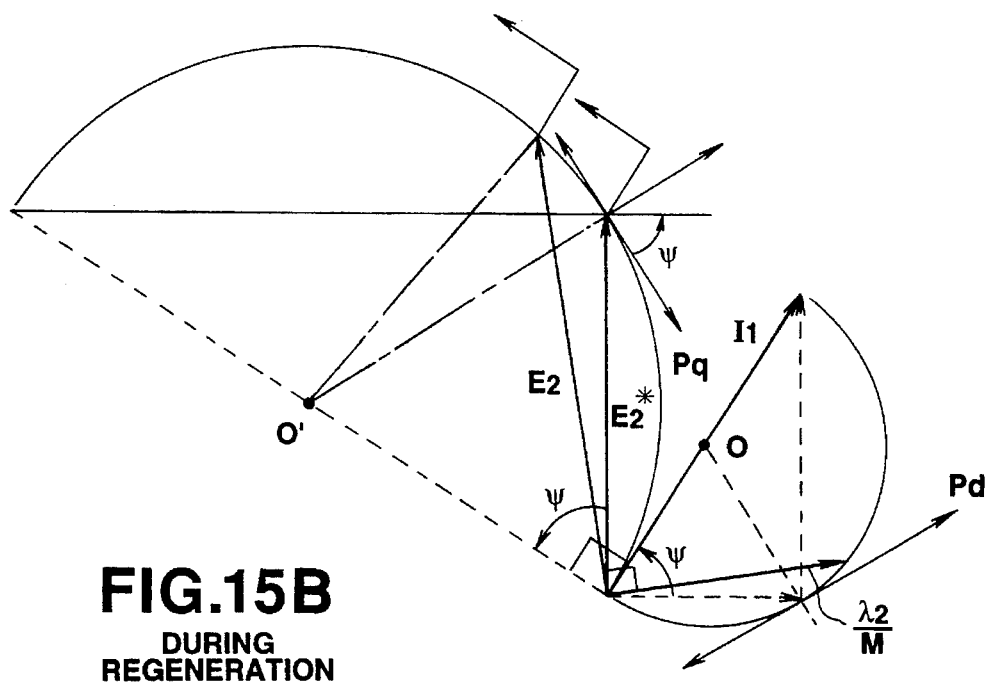
FIG. 15A is a view similar to FIG. 14A, upon power running.
Figure 15B:
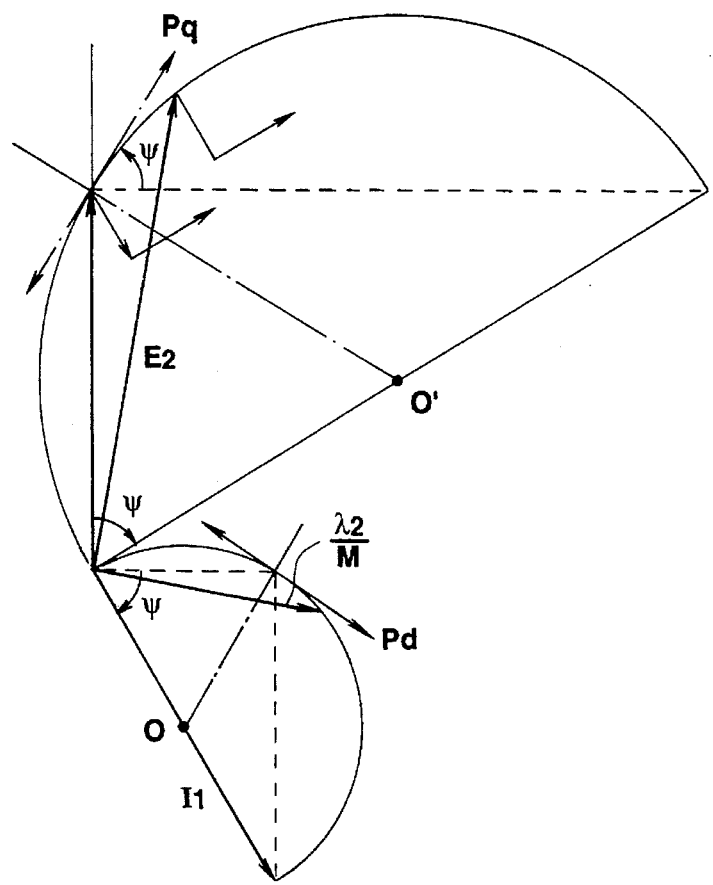
FIG. 15B is a view similar to FIG. 15A, upon regeneration.

Therefore, when the secondary resistance $R_2'$ is varied in the steady state, the voltage-current vector diagram is as shown in FIGS. 15A and 15B. FIG. 15A is a vector diagram upon power running, whereas FIG. 15B is a vector diagram upon regeneration. As shown in FIGS. 15A and 15B, the secondary magnetic flux $\lambda_2/M$ is changed in the direction of a tangent line Pd of a first circle having a center O, whereas the secondary voltage $E_2$ is changed in the direction of a tangent line Pq of a second circle having a center O'.

As seen from FIGS. 15A and 15B, in connection with the secondary voltage $E_2^*$ of the model, the actual secondary voltage $E_2$ is given by a formula (7'):

$$E_2 = V_1 - (R_1 I_1 + j\omega L\sigma I_1) \tag{7'}$$

When obtaining an error voltage between $E_2^*$ and $E_2$, and transforming the coordinates of the error voltage in the reverse direction of a phase ψ between the γ axis of the primary current $I_1$ and the d axis of the secondary magnetic flux, i.e., into the -ψ coordinates, the error voltage is in the direction of the tangent line of the second circle, thus obtaining the coordinates which enables an effective detection of a voltage variation due to the secondary resistance $R_2'$.

The above is summarized as follows:

1) The q-axis component of the secondary voltage $E_2^*$ of the model is obtained:

$$E_2 q^* = \omega_1 M'(\lambda_2 d/M)^*$$

2) The d- and q-axis components of the actual secondary voltage $E_2$ are obtained from the output voltage of the induction motor:

$$E_2 d = V_1 d - (R_1 I_1 d - \omega L\sigma I_1 q)$$

$$E_2 q = V_1 q - (R_1 I_1 q + \omega L\sigma I_1 d)$$

3) The error voltage between $E_2^*$ and $E_2$ is obtained:

$$\Delta E_2 d = E_2 d - 0$$

$$\Delta E_2 q = E_2 q - E_2 q^*$$

4) The phase ψ of the primary current is obtained:

$$\psi = \tan^{-1}(I_1 q^*/I_1 d^*)$$

5) The coordinates of the error voltage components $\Delta E_2 d$, $\Delta E_2 q$ are transformed into the -ψ coordinates:

$$\Delta E_{R2H} = sign(I_1 q^*) \cdot (\Delta E_2 d \cdot \cos \psi - \Delta E_2 q \cdot \sin \psi)$$

The secondary resistance $R_2^*$ of the model is corrected by $\Delta E_{R2H}$. That is, if $\Delta E_{R2H}$ is positive, $R_2^*$ is reduced, whereas if $\Delta E_{R2H}$ is negative, $R_2^*$ is increased.

Figure 12:
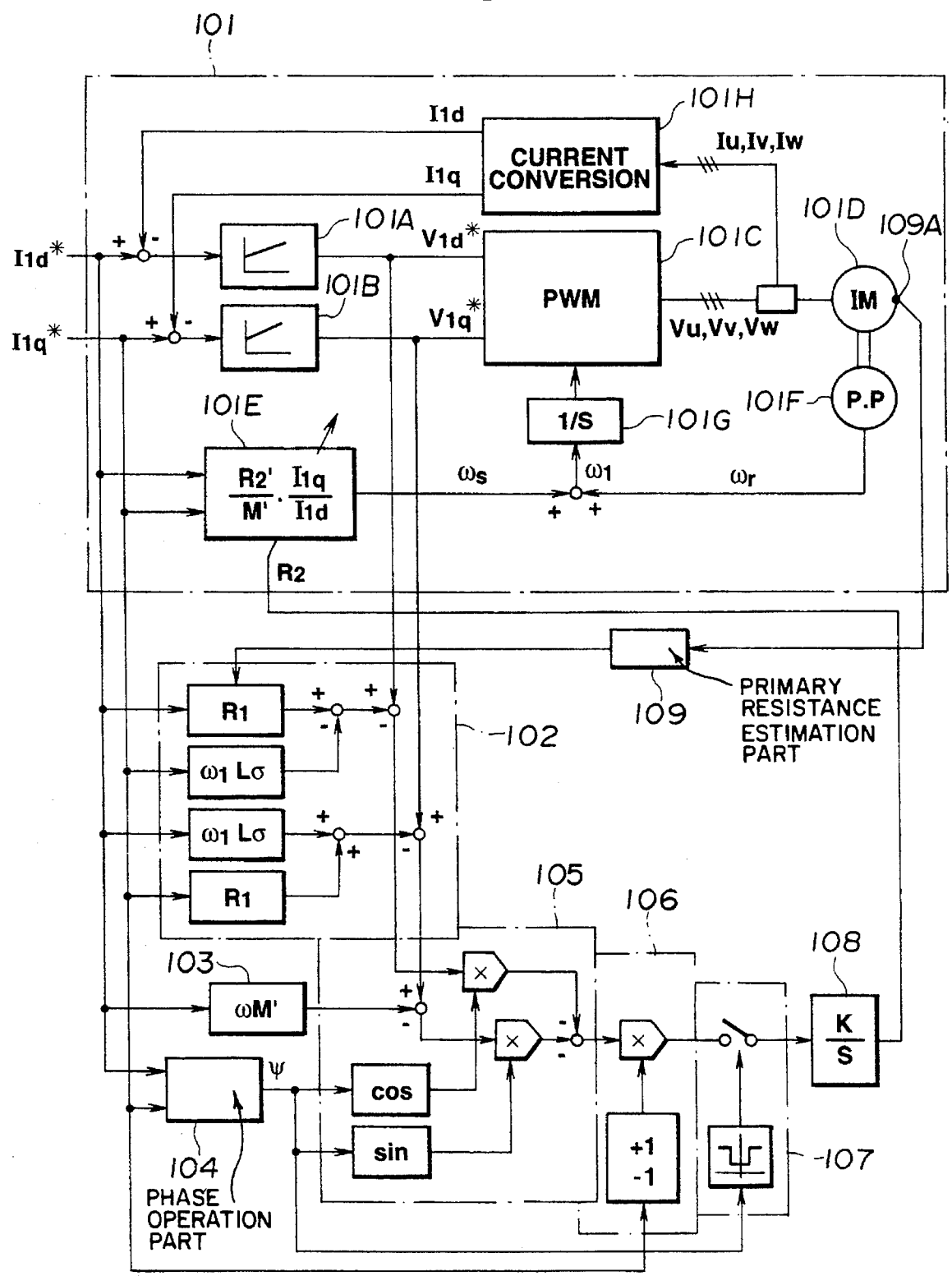
FIG. 12 is a view similar to FIG. 2, showing a third preferred embodiment of the present invention.

Referring to FIG. 12, in a vector control part 101, out of a current command $I_1 d^*$ ($= -\lambda_2 d/M$) of the d axis and a current command $I_1 q^*$ of the q axis, and detected current components $I_1 d$, $I_1 q$ of the primary current, ACR amplifiers 101A, 101B fetch d- and q-axis voltage commands $V_1 d^*$, $V_1 q^*$, respectively. A PWM circuit 101C provides three-phase output voltages Vu, Vv, Vw which serves as a primary voltage of the induction motor 101D.

A slip frequency operation part 101E calculates a slip frequency $\omega_S$ from the current commands $I_1 d^*$, $I_1 q^*$ and a constant $R_2'/M'$, which is added to a an angular frequency $\omega_r$ detected by a speed detector 101F of a rotor of the induction motor 101D so as to obtain a primary angular frequency $\omega_1 1$. The primary angular frequency $\omega_1 1$ is integrated by an integrator 101G to obtain a phase angle by which the PWM circuit 101C has PWM signals of the three-phase voltages Vu, Vv, Vw. A current conversion part 101H converts three-phase currents Iu, Iv, Iw into the above current components $I_1d$, $I_1q$.

A secondary resistance compensation part having elements 102–109 corrects the secondary resistance $R_2'$ of the slip frequency operation part 101E.

The secondary induced voltage detection part 102 subtracts voltage drops $I_1dR_1$ and $I_1q\omega_1 L\sigma$ of the primary resistance $R_1$ and the primary equivalent leakage inductance $L\sigma$ due to the primary current components from the voltage command outputs $V_1d^*$, $V_1q^*$ of the ACR amplifiers 101A, 101B, respectively, thus detecting a secondary induced voltage.

The secondary reverse voltage operation part 103 calculates out of the current command $I_1d^*$ and a preset constant $\omega M'$ a secondary reverse voltage when having the ideal vector control.

The phase operation part 104 calculates out of the current commands $I_1d^*$, $I_1q^*$ a phase $\psi$ of a vector of the primary current with respect to the d axis:

$$\psi = \tan^{-1}(I_1q^*/I_1d^*)$$

The error voltage detection part 105 subtracts a voltage of the secondary reverse voltage operation part 103 from the detected voltage of the secondary induced voltage detection part 102. This subtraction result is multiplied by sine and cosine waves with the phase $\psi$ of the phase operation part 104 so as to calculate coordinate components of a negative phase of the phase $\psi$, thus obtaining an error voltage.

The correction operation part 106 corrects the polarity of the error voltage by multiplying a detection value thereof by +1 or −1 in accordance with a sign of the q-axis current command $I_1q^*$.

The correction selection circuit 107 carries out an interruption of correction of the secondary resistance $R_2'$ based on error voltage detection when a slip angle is smaller than the phase $\psi$ calculated by the phase operation part 104.

The secondary resistance correction part 108 having an integral characteristic estimates the secondary resistance $R_2'$ in a predetermined ratio when the correction selection circuit 107 selects the error voltage, and corrects thereby a set value of the secondary resistance $R_2'$ of the slip frequency operation part 101E.

The primary resistance estimation part 109 estimates the primary resistance $R_1$ set in the secondary induced voltage detection part 102 out of a temperature sensor 109A embedded in the primary winding of the induction motor 101D, thus correcting a set value of the primary resistance $R_1$.

Having described the present invention in connection with the preferred embodiments, it is to be noted that the present invention is not limited thereto, and various changes and modifications are possible without departing from the spirit of the present invention.

What is claimed is:

1. A vector control system for an induction motor which is driven by an inverter controlled by a pulse width modulation circuit, the system carrying out compensation for variation of a secondary resistance, comprising:

first means for calculating target values $I_1d^*$ and $I_1q^*$ of d- and q-axis components of a primary current of the induction motor on d-q coordinates having a secondary magnetic flux set as a reference axis, said d-q coordinates being rotational coordinates which rotate in synchronism with a power source angular frequency of the induction motor;

a first coordinate transformation part arranged to calculate in accordance with said target values $I_1d^*$ and $I_1q^*$ of said d- and q-axis components a target value $I_1\gamma^*$ ($=I_1$) of a $\gamma$-axis component of the primary current and a phase difference $\psi$ on $\gamma$-$\delta$ coordinates having said phase difference $\psi$ with respect to d-q axes and having said primary current $I_1$ set as a reference axis;

a slip angular frequency operation part arranged to input and calculate a ratio $\lambda_{2d}^*/M^*$ and said target value $I_1q^*$ of said q-axis component so as to output a target value $\omega_S^*$ of a slip angular frequency;

second means for calculating target values $V_1\gamma^*$ and $V_1\delta^*$ of $\gamma$- and $\delta$-axis components of a primary voltage in accordance with a ratio $\lambda_{2d}^*/M^*$ of a target value $\lambda_{2d}^*$ of said secondary magnetic flux to a target value $M^*$ of an exciting inductance, calculation results of said first coordinate transformation part and a command value $\omega_0$ of said power source angular frequency;

a second coordinate transformation part arranged to transform a detection value of said primary current into actual $\gamma$- and $\delta$-axis components $I_1\gamma$ and $I_1\delta$ on said $\gamma$-$\delta$ coordinates;

third means for calculating a variation $\Delta V_1\delta$ with respect to said $V_1\delta^*$ of said $\delta$-axis component of said primary voltage in accordance with said target values $I_1\gamma^*$ and $I_1\delta^*$ of said $\gamma$- and $\delta$-axis components of said primary current and said actual $\gamma$- and $\delta$-axis components $I_1\gamma$ and $I_1\delta$ derived from said second coordinate transformation part;

a polar coordinate transformation part arranged to add said target values $V_1\gamma^*$ and $V_1\delta^*$ derived from said second means to said variation $\Delta V_1\delta$ derived from said third means so as to output a magnitude $|V_1|$ of a vector of said primary voltage and a phase angle $\phi$ thereof with respect to a $\gamma$ axis; and fourth means for minimizing an error with regard to compensation for variation of the secondary resistance, and including a first operation part arranged to carry out a polar coordinate transformation of said target values $V_1\gamma^*$ and $V_1\delta^*$ of said second means so as to output an amplitude component $|V_1^*|$;

a second operation part arranged to calculate a deviation between said amplitude component $|V_1^*|$ of said first operation part and said magnitude $|V_1|$ of said vector of said primary voltage so as to output an amplitude variation error $\Delta|V_1|$;

third and fourth operation parts arranged to input said amplitude variation error $\Delta|V_1|$ derived from said second operation part and said variation $\Delta V_1\delta$ derived from said third means and provide outputs by switching the two; and a third adder arranged to add said outputs of said third and fourth operation parts so as to input said voltage variation control part.

2. A vector control system as claimed in claim 1, further comprising:

a voltage detector arranged on the output side of the inverter to detect an inverter voltage, said inverter voltage being provided to said second operation part so as to calculate a deviation between an output of said voltage detector and an output of said first operation part.

3. A vector control system as claimed in claim 1, wherein said fourth means further comprises:

a secondary induced voltage detection part arranged to obtain a detection voltage by subtracting a voltage drop in a primary resistance $R_1$ and a primary equivalent leakage inductance $L\sigma$ due to a primary current component from an output voltage of current control amplifiers of d and q axes;

a secondary reverse voltage operation part arranged to calculate in accordance with a preset constant of the induction motor and a current command value a secondary reverse voltage when having an ideal vector control;

a phase operation part arranged to calculate a phase $\psi$ of a vector of said primary current with respect to said d axis in accordance with said current command value;

an error voltage detection part arranged to subtract said secondary reverse voltage of said secondary reverse voltage operation part from said detection voltage of said secondary induced voltage detection part so as to obtain an error voltage, said error voltage serving to calculate a coordinate component of a reverse phase of said phase $\psi$;

a correction operation part arranged to change a polarity of said error voltage of said error voltage detection part in accordance with a sign of a current command of a q axis; and a secondary resistance correction part arranged downstream of said correction operation part to estimate the secondary resistance by said error voltage so as to correct the secondary resistance for calculation of said slip angular frequency.

4. A vector control system as claimed in claim 1, wherein said third and fourth operation parts have a weight function to a rotating speed of the induction motor, respectively.

5. A vector control system for an induction motor which is driven by an inverter controlled by a pulse width modulation circuit, the system carrying out compensation for variation of a secondary resistance, comprising:

first means for calculating target values $I_1d^*$ and $I_1q^*$ of d- and q-axis components of a primary current of the induction motor on d-q coordinates having a secondary magnetic flux set as a reference axis, said d-q coordinates being rotational coordinates which rotate in synchronism with a power source angular frequency of the induction motor;

a first coordinate transformation part arranged to calculate in accordance with said target values $I_1d^*$ and $I_1q^*$ of said d- and q-axis components a target value $I_1\gamma^*$ $(=I_1)$ of a $\gamma$-axis component of the primary current and a phase difference $\psi$ on $\gamma$-$\delta$ coordinates having said phase difference $\psi$ with respect to d-q axes and having said primary current $I_1$ set as a reference axis;

second means for calculating target values $V_1\gamma^*$ and $V_1\delta^*$ of $\gamma$- and $\delta$-axis components of a primary voltage in accordance with a ratio $\lambda_{2d}^*/M^*$ of a target value $\lambda_{2d}^*$ of said secondary magnetic flux to a target value $M^*$ of an exciting inductance, calculation results of said first coordinate transformation part and a command value $\omega_0$ of said power source angular frequency;

a slip angular frequency operation part arranged to input and calculate said ratio $\lambda_{2d}^*/M^*$ and said target value $I_1q^*$ of said q-axis component so as to output a target value $\omega_s^*$ of a slip angular frequency;

a second coordinate transformation part arranged to transform a detection value of said primary current into actual $\gamma$- and $\delta$-axis components $I_1\gamma$ and $I_1\delta$ on said $\gamma$-$\delta$ coordinates;

third means for calculating a variation $\Delta V_1\delta$ with respect to said $V_1\delta^*$ of said $\delta$-axis component of said primary voltage in accordance with said target values $I_1\gamma^*$ and $I_1\delta^*$ of said $\gamma$- and $\delta$-axis components of said primary current and said actual $\gamma$- and $\delta$-axis components $I_1\gamma$ and $I_1\delta$ derived from said second coordinate transformation part;

a polar coordinate transformation part arranged to add said target values $V_1\gamma^*$ and $V_1\delta^*$ derived from said second means to said variation $\Delta V_1\delta$ derived from said third means so as to output a magnitude $|V_1|$ of a vector of said primary voltage and a phase angle $\phi$ thereof with respect to a $\gamma$ axis; and fourth means for minimizing an error with regard to compensation for variation of the secondary resistance, the fourth means including a secondary induced voltage detection part arranged to obtain a detection voltage by subtracting a voltage drop in a primary resistance $R_1$ and a primary equivalent leakage inductance $L\sigma$ due to a primary current component from an output voltage of current control amplifiers of d and q axes;

a secondary reverse voltage operation part arranged to calculate in accordance with a preset constant of the induction motor and a current command value a secondary reverse voltage when having an ideal vector control;

a phase operation part arranged to calculate a phase $\psi$ of a vector of said primary current with respect to said d-axis in accordance with said current command value;

an error voltage detection part arranged to subtract said secondary reverse voltage of said secondary reverse voltage operation part from said detection voltage of said secondary induced voltage detection part so as to obtain an error voltage, said error voltage serving to calculate a coordinate component of a reverse phase of said phase $\psi$;

a correction operation part arranged to change a polarity of said error voltage of said error voltage detection part in accordance with a sign of a current command of said q-axis; and a secondary resistance correction part arranged downstream of said correction operation part to estimate the secondary resistance by said error voltage so as to correct the secondary resistance for calculation of said slip angular frequency.

\* \* \* \* \*